United States Patent [19]

Grigo et al.

[11] Patent Number: 4,847,153
[45] Date of Patent: Jul. 11, 1989

[54] METAL PLATED MOLDED COMPOSITIONS CONTAINING POLYCARBONATE AND A CERTAIN ABS RESIN

[75] Inventors: Ulrich R. Grigo, Kempen, Fed. Rep. of Germany; Stuart L. Cohen, Ardsley, N.Y.

[73] Assignee: Mobay Corporation, Pittsburgh, Pa.

[21] Appl. No.: 173,838

[22] Filed: Mar. 28, 1988

Related U.S. Application Data

[60] Division of Ser. No. 936,855, Dec. 2, 1986, abandoned, which is a continuation of Ser. No. 781,594, Sep. 30, 1985, abandoned, which is a continuation-in-part of Ser. No. 613,651, May 25, 1984, abandoned, which is a continuation-in-part of Ser. No. 513,529, Jul. 13, 1983, abandoned.

[51] Int. Cl.$^4$ ............................................. B32B 27/28
[52] U.S. Cl. .................................... 428/412; 428/462; 525/67; 525/71; 525/146
[58] Field of Search ................. 428/412, 428; 525/67, 525/71, 146

[56] References Cited

U.S. PATENT DOCUMENTS

| | | | |
|---|---|---|---|
| Re. 28,723 | 2/1976 | Holder et al. | 260/873 |
| 3,130,177 | 4/1964 | Grabowski | 260/45.5 |
| 3,162,695 | 12/1964 | Grabowski | 260/873 |
| 3,700,481 | 10/1972 | Chin et al. | 428/462 |
| 3,712,934 | 1/1973 | Kiuchi et al. | 525/71 |
| 3,852,393 | 12/1974 | Furukawa et al. | 260/873 |
| 3,954,905 | 5/1976 | Margotte et al. | 260/873 |
| 3,988,389 | 10/1976 | Margotte et al. | 260/873 |
| 4,082,895 | 4/1978 | Backderf et al. | 428/412 |
| 4,245,058 | 1/1981 | Liu | 525/148 |
| 4,260,693 | 4/1981 | Liu | 525/148 |
| 4,263,415 | 4/1981 | Liu | 525/148 |
| 4,263,416 | 4/1981 | Liu et al. | 525/148 |
| 4,299,928 | 11/1981 | Witman | 525/67 |
| 4,390,657 | 6/1983 | Liu | 525/67 |
| 4,515,921 | 5/1985 | Witman | 525/67 |
| 4,588,623 | 5/1986 | Hartsing et al. | 428/462 |

FOREIGN PATENT DOCUMENTS 1253226  11/1971  United Kingdom .

*Primary Examiner*—Wilbert J. Briggs, Sr.
*Attorney, Agent, or Firm*—Gene Harsh; Joseph C. Gil; Aron Preis

[57] ABSTRACT

The invention concerns thermoplastic molding compositions comprising a blend of a polycarbonate resin, a conjugated diene graft polymer and an impact modifying agent characterized in that said conjugated diene graft polymer contains at least some α-methyl styrene which compositions combine improved impact strength and good HDT values.

2 Claims, No Drawings

METAL PLATED MOLDED COMPOSITIONS CONTAINING POLYCARBONATE AND A CERTAIN ABS RESIN

CROSS REFERENCE TO RELATED APPLICATION

This application is a division, of application Ser. No. 936,855 filed Dec. 2, 1986, abandoned, which is a continuation of Ser. No. 781,594, filed Sept. 30, 1985, now abandoned, which is a continuation in part of Ser. No. 613,651, filed May 25, 1984, now abandoned, which is a continuation in part of Ser. No. 513,529 filed July 13, 1983 (now abandoned).

FIELD OF THE INVENTION

The invention concerns thermoplastic molding compositions and more particularly compositions containing a polycarbonate resin and a conjugated diene graft polymer.

SUMMARY OF THE INVENTION

The thermoplastic molding compositions of the invention comprising a blend of a polycarbonate resin, a conjugated diene graft polymer and an impact modifying rubber characterized in that said butadiene graft polymer contains at least some α-methyl styrene and further in that it combines improved impact strength and good HDT value.

BACKGROUND OF THE INVENTION

Compositions containing a blend of polycarbonate and ABS were disclosed in U.S. Pat. Nos. 3,130,177 and 3,852,393. Similar compositions were disclosed in U.S. Pat. Nos. 3,954,905 and 3,988,389 to possess improved weld line strength.

Improved impact strength of polycarbonates by the incorporation of a graft elastomer has been the subject of numerous U.S. Patents, for instance, U.S. Pat. Nos. 4,299,928, 4,245,058, U.S. Pat. No. Re. 28,723, U.S. Pat. Nos. 4,263,416, 4,263,415, 4,260,693 and 4,082,895 among others.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have molecular weights of 10,000–200,000 (average molecular weight), preferably 20,000–80,000 and may have a melt flow rate per ASTM D-1238 at 300° C. of about 1 to about 24 gm/10 min., preferably about 2–15 gm/10 min. They may be prepared, for example, by the known diphasic interface process from a carbonic acid derivative such as phosgene and from dihydroxy compounds by polycondensation (see German Offenlegungsschriften Nos. 2,063,050; 2,063,052; 1,570,703; 2,211,956; 2,211,957 and 2,248,817; French Pat. No. 1,561,518; and the monograph, H. Schnell, "Chemistry and Physics of Polycarbonates", Interscience Publishers, New York, 1964, all incorporated herein by reference).

In the present context, dihydroxy compounds suitable for the preparation of the copolycarbonates of the invention conform to the structural formulae (1) or (2)

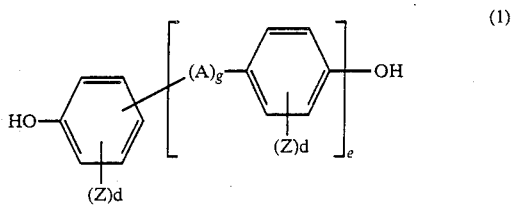

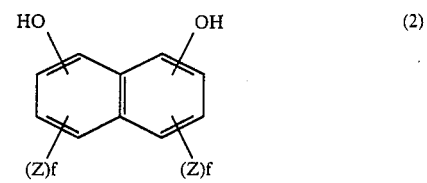

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —SO$_2$— radical conforming to

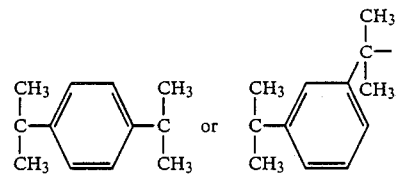

e and g both denote the number 0 to 1;
Z denotes F, Cl, Br or C$_1$–C$_4$-alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl-ketones, bis-(hydroxyphenyl)-sulfoxides, bis-(hydroxyphenyl)-sulfones and α,α-bis-(hydroxyphenyl)-diisopropyl-benzenes, as well as their nuclearalkylated compounds. These and further suitable aromatic dihydroxy compounds are described, for example, in U.S. Pat. Nos. 3,028,365; 2,999,835; 3,148,172; 2,991,273; 3,271,367; and 2,999,846, all incorporated herein by reference. Further examples of suitable bisphenols are 2,2-bis-(4-hydroxphenyl)-propane (bisphenol-A), 2,4-bis-(4-hydroxyphenyl)-2-methyl-butane, 1,1-bis-(4-hydroxyphenyl)-cyclohexane, α,α-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl benzene and 4,4'-sulfonyl diphenyl.

Examples of particularly preferred aromatic bisphenols are 2,2-bis-(4-hydroxyphenyl)-propane, 2,2-bis- (3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol-A).

The polycarbonates of the invention may entail in their structure units derived from one or more of the suitable bisphenols.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (based on the quantity of bisphenols used) of polyhydroxyl compounds. Polycarbonates of this type have been described, for example, in German Offenlegungsschriften Nos. 1,570,533; 2,116,974 and 2,113,374; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4',4''-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Merlon M-39, Merlon M-40 and Merlon M-50, all of which are bisphenol-A based polycarbonate resins differing in their respective molecular weights and characterized in that their melt indices per ASTM D-1238 are 12–24, 6–11.9 and 3.0–5.9 gm/10 min., respectively, all available from Mobay Chemical Corporation of Pittsburgh, Pa.

Conjugated Diene Graft Polymer

In the present context, conjugated diene graft polymers are ABS (acrylonitrile-butadiene-styrene) types of resins characterized in that their rubbery backbone (essentially based on polybutadiene) content is about 1 to 40% by weight, preferably 3 to 30% by weight and in that its grafted phase comprises the polymerized mixture of monovinyl aromatic monomers and α-alkyl substituted monovinyl aromatic monomers preferably in a weight ratio therebetween of about 30/1 to 1/30.

Essentially, the molecules of ABS resins consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

A specific conjugated diene monomer which may be utilized in preparing the backbone of the graft polymer is generically described by the formula:

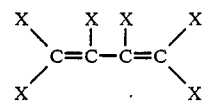

wherein X may be selected from the group consisting of hydrogen, halogen, alkyl groups consisting from one to five carbon atoms, chloro and bromo. Examples of dienes that may be used are butadiene; isoprene; 1,3-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes; chloro- and bromo-substituted butadienes such as dichlorobutadiene, bromobutadiene, chloroprene, dibromobutadiene, mixtures thereof and the like. The preferred conjugated diene utilized herein is butadiene.

The grafted phase, polymerized in the presence of the prepolymerized backbone is characterized in that it comprises a mixture of monomers containing at least one member of each of groups (i) and (ii) and optionally one or more members from group (iii):

(i) monovinyl aromatic monomers conforming to the formula

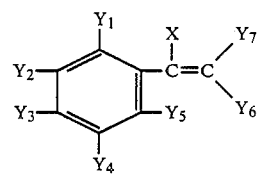

wherein $Y_1$–$Y_7$ independently denote a hydrogen, chlorine or bromine atom or a $C_1$–$C_5$ alkyl group and X denotes a hydrogen, chlorine or bromine atom. Examples of this compound include styrene as well as alkyl, cycloalkyl aryl, alkaryl, aralkyl, alkoxy and araloxy substituted vinyl aromatic compounds. Preferably, the suitable compounds are styrene, 3-methylstyrene, 3,5-diethylstyrene and 4-n-propylstyrene, α-chlorostyrene, vinyltoluene, α-bromostyrene, chlorophenyl ethylene, dibromophenyl ethylene, tetrachlorophenyl ethylene, 1-vinylnaphthalene, 2-vinylnaphthalene and mixtures thereof. The most preferred compound in this group is styrene;

(ii) α-alkyl substituted monovinyl aromatic monomers conforming to

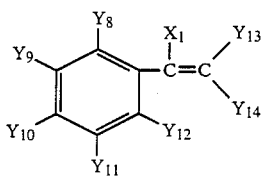

wherein $Y_8$–$Y_{14}$ independently are a hydrogen, chlorine or bromine atom or a $C_1$–$C_5$ alkyl group and $X_1$ is a $C_1$–$C_5$ alkyl group, for instance a methyl group;

(iii) acrylonitrile, substituted acrylonitrile and/or acrylic acid esters exemplified by acrylonitrile and alkyl acrylates such as methylmethacrylate. The acrylonitrile, substituted acrylonitrile or acrylic acid esters are described generically by the formula:

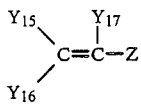

wherein $Y_{15}$–$Y_{17}$ independently may be selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples of monomers of this description, i.e. acrylonitrile, substituted acrylonitrile, or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methacrylate, methylmethacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

The butadiene graft polymer used in the course of demonstrating the invention in the working examples below—hereinafter "M-ABS"—is characterized by its (approximate) chemical composition as follows: polybutadiene, about 15%; acrylonitrile, about 23%; styrene, about 48%; and α-methyl styrene, about 14%.

The Impact Modifier

The impact modifier suitable in the practice of the invention are compounds characterized in that they contain at least 45 percent, preferably about 45 to about 98 percent of an elastomeric phase, said percent being relative to the weight of the modifier and further in that the glass transition temperature of the elastomeric phase is below 20° C., preferably below 10° C. In principle, any rubber may be used as the elastomeric component of the impact modifier so long as its properties correspond to the criteria set out above. Cross-linking of the rubber elastic phase is an optional feature of the impact modifier. Among the suitable rubbers are homopolyacrylates and copolyacrylates as well as polymers of conjugated dienes and copolymers of conjugated dienes.

Particularly suitable rubbers are polybutadiene, butadiene copolymers having up to 30% by weight of copolymerized styrene or acrylonitrile and copolymers of butadiene with up to 20% by weight of a lower alkyl ester of an acrylic or a methacrylic acid for example, methacrylate, methylmethacrylate and ethylmethacrylate as well as butyl or ethyl acrylate; also suitable are any of the acrylate based rubbers such as $C_1$–$C_6$-alkyl acrylate, preferably a butylacrylate.

The rubbers in the context of the invention may have grafted thereto a "shell"—or a grafted phase—comprising the polymerized product of one or more monomers. The weight ratio between the rubber to the graft polymerized monomers of such embodiments is generally within the range of from 85:15 to about 45:55.

Grafted impact modifiers of this type are known. The may be obtained, for example, by polymerizing the monomers on a rubber latex in the presence of a radical catalyst and are available in commerce, for instance, from Bayer AG of Leverkusen, West Germany.

Other suitable grafts are available under the tradename Kane Ace B56, an MBS (methacrylate-butadiene-styrene) from Kanegafuchi of Osaka, Japan and various other ABS resins.

Among the acrylate based grafts are the multiphase acrylic rubber interpolymer composites described in U.S. Pat. Nos. 3,808,180 and 4,096,202, both incorporated herein by reference. Briefly, the technology described therein is that of the preparation of a specific class of multiphase compounds. Among these, the compositions suitable in the present context are the ones comprising about 45 to 95% by weight of a first elastomeric phase and about 55 to 5% by weight of a second, rigid, thermoplastic phase. The first phase is polymerized from about 75 to 99.8% by weight $C_1$–$C_6$ acrylate resulting in an acrylic rubber core having a glass transition temperature below about 10° C., which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable groups, at least one of which polymerizing at a substantially different rate of polymerization from at least one other of said reactive groups. The function of the graft-linking monomer is to provide a residual level of unsaturation in the elastomeric phase, particularly in the latter stage of polymerization and, consequently, at or near the surface of the elastomer particles. The preferred graft-linking monomer is allyl methacrylate and diallyl maleate.

The final stage monomer system can be comprised of $C_1$–$C_6$ methacrylate, styrene, acrylonitrile, alkyl acrylates, alkyl methacrylate, dialkyl methacrylate and the like, so long as the Tg is over at least 20° C. Preferably, the final stage monomer system is at least 50% by weight $C_1$–$C_4$ alkyl methacrylate. It is further preferred that the final stage polymer be free of units which tend to degrade poly(alkylene terephthalate); for example, acid, hydroxyl amino and amide groups.

A certain such acrylic rubber interpolymer composite characterized in that acrylic rubber core is comprised of n-butyl-acrylate and in that its cross-linking agent is 1,3-butylene diarylate and in which the graft-linking agent is diallyl maleate and the second phase monomeric system of which is methylmethacrylate is noted to be particularly suitable in the present context.

The compositional makeup of the preferred interpolymer compound is described by the weight ratios of its constituent monomers as follows: n-butyl acrylate/1,3-butylene diacrylate/diallyl maleate/methylmethacrylate—79.2/0.4/0.4/20.0. Such preferred acrylic rubber interpolymer composite is available under the tradename Acryloid ®KM-330 from Rohm & Haas Company of Philadelphia, Pa.

Included among the suitable impact modifiers are MBS (methacrylate-butadiene-styrene grafts) and ABS (acrylonitrile-butadiene-styrene grafts) resins.

The thermoplastic molding compositions of the invention comprise a blend containing 20 to 95 phr of polycarbonate resin, 3 to 78 phr of the graft polymer and 2 to 20 phr of the impact modifier; a corresponding preferred set of ranges is 30 to 80 phr of polycarbonate, 10 to 60 phr of the graft polymer and 5 to 15 phr of the impact modifier.

Among the advantages offered by the compositions of the invention are thermal stability in combination with good impact resistance and heat deflection under load. For instance, the degree of thermal stability may be appreciated upon considering the HDT value (under 264 psi) of greater than 110° C. and a notched Izod impact strength (¼" specimens, per ASTM D-256) of higher than 5.0 ft. lb./in. associated with specimens molded at about 525° F.

In addition to the components of the composition of the invention, as noted above, the composition may contain mold release agents pigments, dyes, flame retardants, stabilizers to heat and moisture as well as fillers and reinforcing agents of the types known in the art.

The preparation of the composition of the invention follows a procedure comprising dry blending of the ingredients followed by extrusion and pelletizing by means well established in the art and exemplified below.

The invention will be illustrated but is not intended to be limited by the Examples below.

EXAMPLES

Examples 1–5

Compositions in accordance with the present invention were prepared and a summary of their properties is presented below. In preparing these compositions, the polycarbonate resin was a homopolycarbonate based on bisphenol-A, characterized in that its melt index was between 3.0 to 5.9 gm/10 min. The impact modifiers used were Acryloid KM 330—a product of Rohm and Haas Corporation—which is an acrylate rubber graft characterized in that its rubber content is about 80 percent and Acryloid KM 653—also a product of Rohm and Haas Corporation—which is a graft polymer of methylmethacrylate-butadiene-styrene characterized in that its polybutadiene content is about 70 percent, and in that its styrene content is about 13 percent and its methylmethacrylate content is about 14 percent; the indicated polybutadiene based impact modifiers are characterized both in their polybutadiene content and their SAN graft wherein the ratio between styrene and acrylonitrile was 72/28. The graft polymer used was "M-ABS". After a thorough mixing, the blend, consisting of the indicated components, was extruded on a twin screw (ZSK 53) at a screw speed of 100–110 rpm at a temperature profile of (r to f) 270°/250°/235°/240°/235°/240° C. at a rate of 90–100 lbs/hr. The amounts of the components are indicated in percent by weight.

TABLE 1

|  | 1 | 2[1] | 3[1] | 4[2] | 5[2] |
| --- | --- | --- | --- | --- | --- |
| Polycarbonate, % | 52.0 | 52.0 | 52.0 | 52.0 | 52.0 |
| Graft polymer, % | 48.0 | 38.0 | 38.0 | 38.0 | 38.0 |
| Impact modifier, % | — | 10.0 | 10.0 | 10.0 | 10.0 |
| Melt index, gm/10 min. | 4.0 | 4.2 | 3.0 | — | — |
| Flexural modulus, GPa | 2.48 | 2.35 | 2.13 | — | — |
| Flexural strength, MPa | 61.4 | 56.0 | 54.7 | — | — |
| Ultimate strength, MPa | 97.6 | 87.2 | 80.4 | — | — |
| Izod Impact strength, Notched (ft. lb./in.) specimens Molded at |  |  |  |  |  |
| 450° F. ⅛" | 10.7 | 16.5 | 13.1 | 10.4 | 14.8 |
| ¼" | 5.2 | 9.5 | 12.8 | 8.8 | 13.9 |
| 475° F. ⅛" | 9.5 | 11.0 | 11.7 | 10.0 | 11.4 |
| ¼" | 4.4 | 9.0 | 10.3 | 7.7 | 10.6 |
| 500° F. ⅛" | 8.7 | 10.8 | 11.2 | 9.7 | 10.5 |
| ¼" | 3.9 | 9.3 | 9.9 | 7.1 | 13.0 |
| 525° F. ⅛" | 6.6 | 9.6 | 10.2 | 8.4 | 9.3 |
| ¼" | 3.0 | 7.6 | 9.2 | 6.5 | 11.0 |
| Tensile Strength, MPa |  |  |  |  |  |
| yield | 63.5 | 56.8 | 53.7 | 56.0 | 54.4 |
| ultimate | 63.5 | 56.8 | 53.7 | 56.0 | 54.4 |
| failure | 49.8 | 46.7 | 48.0 | 45.6 | 48.1 |
| elongation at yield, % | 33.0 | 32.0 | 63.0 | 5.0 | 5.0 |
| Heat deflection temperature, °C. at 264 psi | 116.0 | 115.8 | 117.7 | 117.0 | 117.4 |
| Izod Impact Strength, notched (ft. lb./in.) |  |  |  |  |  |
| at −20° C. | 1.9 | 6.1 | 7.7 | 4.9 | 4.2 |
| at −30° C. | 1.5 | 3.0 | 3.3 | 4.4 | 4.0 |
| at −40° C. | 1.7 | 2.5 | 3.2 | 5.1 | 3.1 |

[1]The impact modifier of Example 2 consists of 50% polybutadiene and that of Example 3 of 75% polybutadiene; in both, the balance was SAN, and both are characterized in the average particle size of about 0.3 to 0.5 microns.
[2]Acroylid KM ®653 and Acryloid ®KM 330 were used as the impact modifiers of Compositions 4 and 5, respectively.

It is perhaps instructive to note that the heat deflection temperature of a composition differing from Example 1, above, only in that its graft copolymer contains no α-methyl styrene is about 106° C.

EXAMPLES 6–13

Further compositions in accordance with the invention were prepared and a summary of their properties is presented below. The components used in this series of examples were the same as the ones used in the course of the preparation of the composition of Examples 1–5. The added impact modifying agent was Acryloid ®KM653. Extrusion of the dry blended components was carried out (2" MPM-extruder, compression ratio 2.75:1, screen pack 20-40-60-40-20) at a temperature profile of (rear to front) 270°/280°/270°/255°/245°/265°/265° C.

TABLE 2

|  | 6 | 7 | 8 | 9 | 10 | 11 | 12 | 13 |
| --- | --- | --- | --- | --- | --- | --- | --- | --- |
| Polycarbonate, % | 52.0 | 52.0 | 52.0 | 52.0 | 60.0 | 60.0 | 60.0 | 60.0 |
| Graft polymer, % | 48.0 | 38.0 | 38.0 | 38.0 | 40.0 | 30.0 | 30.0 | 30.0 |
| Impact modifier,[1](%) | — | 10.0 | 10.0 | 10.0 | — | 10.0 | 10.0 | 10.0 |

TABLE 2-continued

|  | 6 | 7 | 8 | 9 | 10 | 11 | 12 | 13 |
|---|---|---|---|---|---|---|---|---|
| Impact Strength, Notched Izod (ft. lb./in.) Specimens molded at | | | | | | | | |
| 450° F. ⅛" | 11.1 | 11.4 | 11.5 | 10.9 | 13.0 | 12.4 | 13.0 | 10.8 |
| ¼" | 8.5 | 8.7 | 9.4 | 4.9 | 8.8 | 9.0 | 10.4 | 8.8 |
| 525° F. ⅛" | 8.0 | 8.7 | 9.4 | 7.9 | 9.0 | 10.5 | 11.3 | 9.6 |
| ¼" | 2.4 | 6.1 | 7.0 | 5.5 | 2.9 | 7.5 | 8.5 | 7.0 |
| Notched Izod (⅛") at | | | | | | | | |
| −20° C. | 3.0 | 6.9 | 6.7 | 5.6 | 7.3 | 10.2 | 9.5 | 7.9 |
| −30° C. | 2.2 | 2.9 | 4.5 | 4.7 | 2.3 | 3.0 | 5.1 | 6.2 |
| −40° C. | 2.5 | 2.9 | 3.1 | 3.1 | 3.1 | 3.0 | 3.4 | 3.4 |
| Heat deflection temperature (°C.) at 264 psi | 115.5 | 114.9 | 117.0 | 114.5 | 118.6 | 117.7 | 119.1 | 120.2 |

[1] The impact modifiers of compositions 7 and 11 was based on 50% polybutadiene and that of compositions 8 and 12, on 75% polybutadiene; in both cases the balance was SAN (S/AN = 72/28); compositions 9 and 13 used Acryloid ® KM 653.

The advantages offered by the compositions of the invention over their prior art counterparts may be better appreciated upon the consideration of the following table.

TABLE 3

|  | Control A | Control B | Control C | Comp. 10 | Comp. 11 | Comp. 12 |
|---|---|---|---|---|---|---|
| Polycarbonate | 60.0[1] | 60.0[1] | 60.0[1] | 60.0[2] | 60.0[2] | 60.0[2] |
| Graft polymer | 40.0[3] | 30.0[3] | 30.0[3] | 40.0[4] | 30.0[4] | 30.0[4] |
| Impact modifier | | | | | | |
| A[5] | — | 10.0 | — | — | 10.0 | — |
| B[6] | — | — | 10.0 | — | — | 10.0 |
| Izod Impact (ft. lb./in.) Specimens molded at 525° F., ¼" | 8.7 | 9.9 | 9.9 | 2.9 | 7.5 | 8.5 |

Notes:
[1] Bisphenol-A based homopolycarbonate having a melt index of about 6–11.9 gm/10 min., per ASTM D-1238.
[2] A bisphenol-A based homopolycarbonate having a melt index of about 3–5.9 gm/10 min.
[3] Dow resin 213, a bulk suspension ABS resin, a product of Dow Chemical Corporation, containing no α-methyl styrene, characterized in that it contains about 8% of butadiene.
[4] "M-ABS", an ABS resin containing α-methyl styrene.
[5] An impact modifier containing 50% polybutadiene grafted with 50% SAN (S/AN = 72/28).
[6] An impact modifier containing 75% polybutadiene grafted with 25% SAN (S/AN = 72/28).

The compositions Control A, B and C were prepared using a ZSK 53, 100–110 rpm, 90–100 lbs./hr., at a temperature profile: 270°/250°/235°/240°/235°/240° C. (rear to front).

The minor differences between the molecular weights of the polycarbonates of the control samples and those of compositions 10, 11 and 12, and the differences between the compounding conditions are not believed to be critical to the demonstration of the invention.

The data clearly shows that the high temperature processing of the prior art compositions did not cause a substantial change in their impact performance as compared to that of the unmodified blend, i.e. the blend termed Control A is sufficiently thermally stable at the processing temperature such that the addition of an impact modifier thereto has but a minimal effect on its impact properties. Conversely, the blend of composition 10 is considerably less stable (the corresponding ¼" impact strength of specimens processed at 450° F. was 8.8 ft.lb./in.) and the improvement attendant upon the addition of an impact modifier thereto is seen to be significant and surprising.

EXAMPLES 14–15

An additional unexpected advantage was found to be associated with the compositions of the invention. The advantage, in terms of the high level of the mechanical properties of metal plated parts molded from the composition, is best represented in the table below. A composition within the scope of the invention was molded into discs and three thin layers of metals, (copper, nickel and chromium) deposited therein by electroless plating. The process for metal plating—Noviganth 341 by Schering AG of Berlin, FDR, entails etching, activation, reduction (using an accelerator) and chemical metal plating (the manner of metal application and the type of metal being deposited are believed to be immaterial to the invention). A prior art composition described below as control was likewise molded and metal plated. The articles molded from the composition were evaluated and their properties are reported below.

|  | 14[1] | 15 Control |
|---|---|---|
| Polycarbonate[2], % | 52.0 | 52.0 |
| Graft polymer[3], % | 38.0 | 48.0 |
| Impact Modifier[4], % | 10.0 | — |
| Gardner Impact, at 73° F. (in-lbs) | | |
| Before plating | 370[5] | 456[5] |
| After plating | 276[5] | <64[6] |
| 90° Peel strength, 1.0 inch (lbs) | | |
| Before thermal cycling | 3.53 | 1.45 |
| After thermal cycling | 3.65 | 2.4 |

Notes
[1] The composition contained a small amount of carbon black having no criticality on the performance of the composition.
[2] A bisphenol A based homopolycarbonate having a melt index of about 3–5.9 gm/10 min.
[3] "M-ABS"
[4] An impact modifier containing 75% polybutadiene grafted with 25% SAN (S/AN = 72/28).
[5] Ductile failure
[6] Brittle failure
[7] In accordance with GM 4372-M, the cycling entailed 10 hours soak at 80° C., ½ hr at room temperature followed by 4 hours at −40° C. prior to testing.

As is clearly evident, the composition of the invention exhibits an improved impact strength retention after plating. Also, the peel adhesion of the claimed composition was significantly better than that of the control.

EXAMPLES 16-17

Prior art compositions similar in most respects to the presently claimed invention except for the absence of the critical α-alkyl substituted monovinyl aromatic monomer from its conjugated diene graft polymer were prepared and evaluated. The table below summarizes the properties and indicates, by way of a comparison, the effect of the incorporated impact modifier in these compositions. As may be apparent upon a review of the data the addition of an impact modifier to these compositions does not improve the impact performance of these compositions. In contrast, the present invention is predicated in part on the thus unexpected improvement in impact performance associated with the claimed compositions—see compositions 6 and 9 respectively.

|  |  | 16 | 17 |
|---|---|---|---|
| Polycarbonate, % | | 52 | 52 |
| Graft polymer[1], % | | 48 | 38 |
| Impact modifier[2], % | | — | 10 |
| Izod impact strength, Notched (ft.lb/in) specimens molded at | | | |
| 450° F. | ⅛" | 14.5 | 11.4 |
| | ¼" | 10.1 | 8.4 |
| 525° F. | ⅛" | 11.1 | 9.7 |
| | ¼" | 8.3 | 6.2 |
| Heat Distortion temperature at 261 psi, °C. | | 105 | 105 |

[1]ABS containing no α-methyl styrene.
[2]Polybutadiene 75% grafted with SAN (S/AN = 72/28)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A metal plated molded part prepared from a composition which comprises (i) 20 to 95 phr of an aromatic polycarbonate, (ii) 2 to 20 phr of an impact modifier which contains at least 45% of an elastomeric phase of a conjugated diene polymer having a glass transition temperature below 20° C., and optionally a grafted phase consisting essentially of either methacrylate and styrene or acrylonitrile and styrene grafts (iii) 3 to 78 phr of a conjugated diene graft polymer having a rubbery backbone and a grafted phase which is characterized in that said backbone is about 1-40% relative to its weight and in that its grafted phase comprises the polymerized mixture of monovinyl aromatic monomers and α-alkyl substituted monovinyl aromatic monomers at a ratio therebetween of from about 30:1 to 1:30 said metal having been deposited on said part by an electroless plating process.

2. The metal plated molded part of claim 1 wherein said composition comprises (i) about 30 to 80 phr of a homopolycarbonate based on bisphenol A, (ii) about 3 to about 15 phr of an impact modifier having between 45 and 85% of a rubbery phase consisting of polymers of conjugated dienes characterized in that the glass transition temperature of said rubbery phase is below 20° C., and (iii) about 10 to about 60 phr of a butadiene based graft polymer having a polybutadiene content of about 3 to about 30% by weight and a grafted phase which comprises the polymerizing mixture of monovinyl aromatic monomers and α-alkyl substituted monovinyl aromatic monomers at a ratio therebetween about 30:1 to about 1:30, said phr being relative to said composition.

* * * * *